United States Patent
Resch et al.

(10) Patent No.: US 10,785,194 B2
(45) Date of Patent: Sep. 22, 2020

(54) PROCESSING INTENTS USING TRUSTED ENTITIES IN A DISPERSED STORAGE NETWORK

(71) Applicant: International Business Machines Corporation, Armonk, NY (US)

(72) Inventors: Jason K. Resch, Chicago, IL (US); Brian F. Ober, Lake in the Hills, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 15/834,366

(22) Filed: Dec. 7, 2017

(65) Prior Publication Data
US 2019/0182220 A1 Jun. 13, 2019

(51) Int. Cl.
| | |
|---|---|
| *H04L 29/06* | (2006.01) |
| *G06F 3/06* | (2006.01) |
| *H04L 9/08* | (2006.01) |
| *G06F 11/10* | (2006.01) |
| *H04L 9/14* | (2006.01) |

(52) U.S. Cl.
CPC .......... *H04L 63/0428* (2013.01); *G06F 3/064* (2013.01); *G06F 3/067* (2013.01); *G06F 3/0619* (2013.01); *G06F 11/1076* (2013.01); *H04L 9/085* (2013.01); *H04L 9/0822* (2013.01); *H04L 9/0825* (2013.01); *H04L 9/0894* (2013.01); *H04L 9/14* (2013.01); *H04L 63/0442* (2013.01); *H04L 2209/34* (2013.01)

(58) Field of Classification Search
CPC . H04L 63/0428; H04L 9/0822; H04L 9/0825; H04L 9/085; H04L 9/0894; H04L 9/14; H04L 63/0442; H04L 2209/34; G06F 3/0619; G06F 3/064; G06F 3/067; G06F 11/1076
See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Yogesh Paliwal
(74) *Attorney, Agent, or Firm* — James Nock; Andrew D. Wright; Roberts Calderon Safran & Cole, P.C.

(57) ABSTRACT

A method for execution by a processing unit in a dispersed storage network (DSN), the method includes creating a unique identifier for intent processing entities (IPEs) and when creating intents, encrypting the contents of intents using an associated intent encryption key (IEK). The method continues by the processing unit encrypting each IEK using a key associated with a trusted IPE (TIPE) to generate an encrypted IEK, followed by storing and transmitting the encrypted IEK, the encrypted contents of the intent, and the IPE ID to the target TIPEs.

20 Claims, 6 Drawing Sheets

(56) References Cited

U.S. PATENT DOCUMENTS

| | | | |
|---|---|---|---|
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Raiford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 7,694,328 | B2 | 4/2010 | Joshi et al. |
| 7,774,831 | B2 | 8/2010 | Kuznetsov et al. |
| 8,146,135 | B2 | 3/2012 | Waissbein et al. |
| 8,966,595 | B1 | 2/2015 | Amacker |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2008/0294785 | A1* | 11/2008 | Ushiyama ............... H04L 12/66 709/228 |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0107036 | A1* | 5/2011 | Resch ..................... H04L 12/00 711/154 |
| 2011/0197272 | A1 | 8/2011 | Mony |
| 2012/0311345 | A1* | 12/2012 | Dhuse ..................... G06F 3/067 713/189 |
| 2013/0232392 | A1* | 9/2013 | Grube ................. G06F 11/1044 714/766 |
| 2013/0325820 | A1* | 12/2013 | Grube ................. G06F 11/0727 707/691 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Jakubeit; "Implementation and Analysis of OpenPGP Functionality via NFC;" Bachelor Thesis; Diss. Jul. 13, 2012; 43 pgs.

Schartner et al.; "Attacking mTAN-applications like e-banking and mobile signatures*" Technical report, University of Klagenfurt, 2011; Dec. 2011; 10 pgs.

(56) References Cited

OTHER PUBLICATIONS

Zhou et al.; "Dissecting Android Malware: Characterization and Evolution"; 2012 IEEE Symposium on Security and Privacy; May 20-23, 2012; pp. 95-109.

* cited by examiner

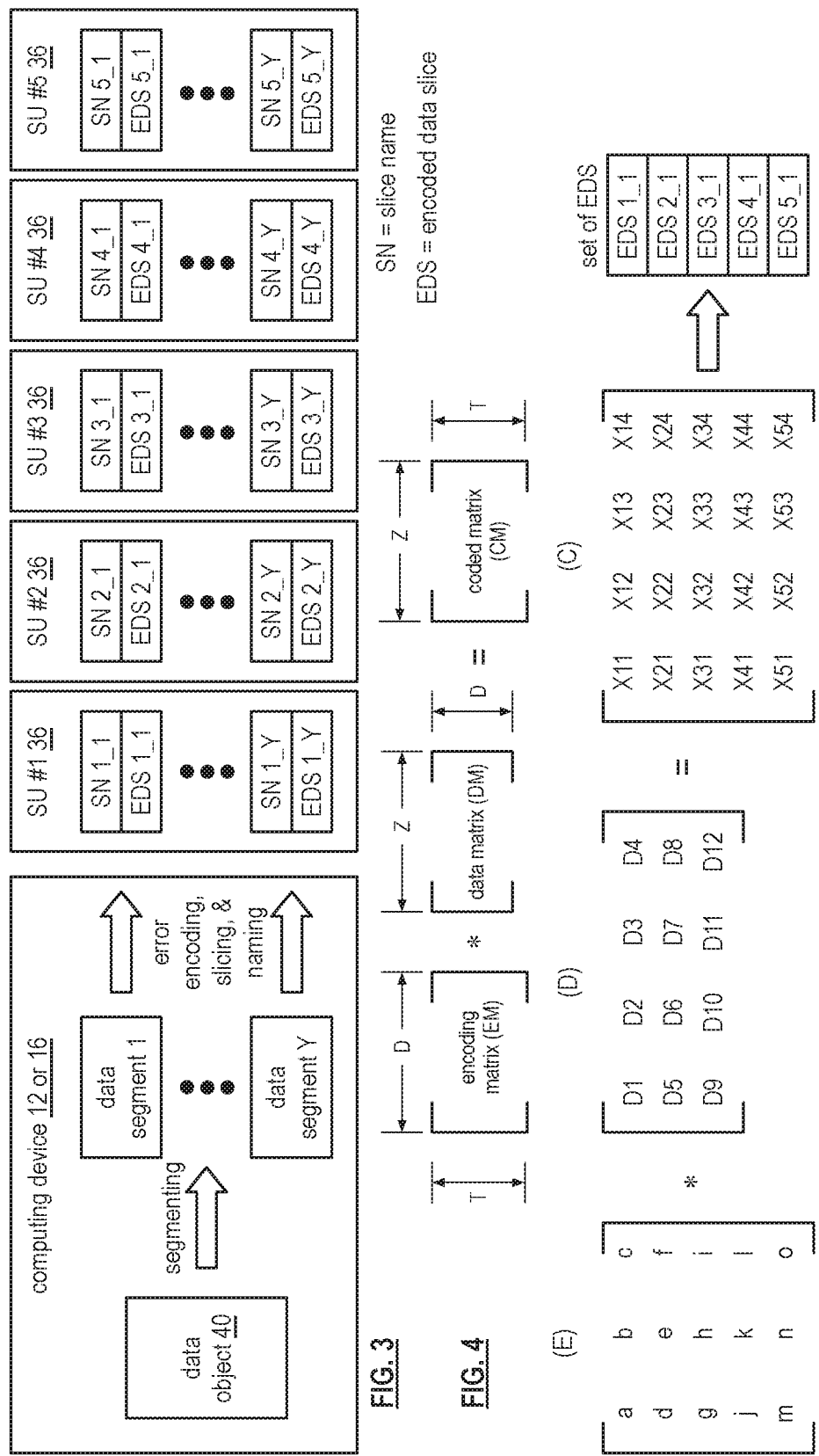

PROCESSING INTENTS USING TRUSTED ENTITIES IN A DISPERSED STORAGE NETWORK

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

Figure 9:
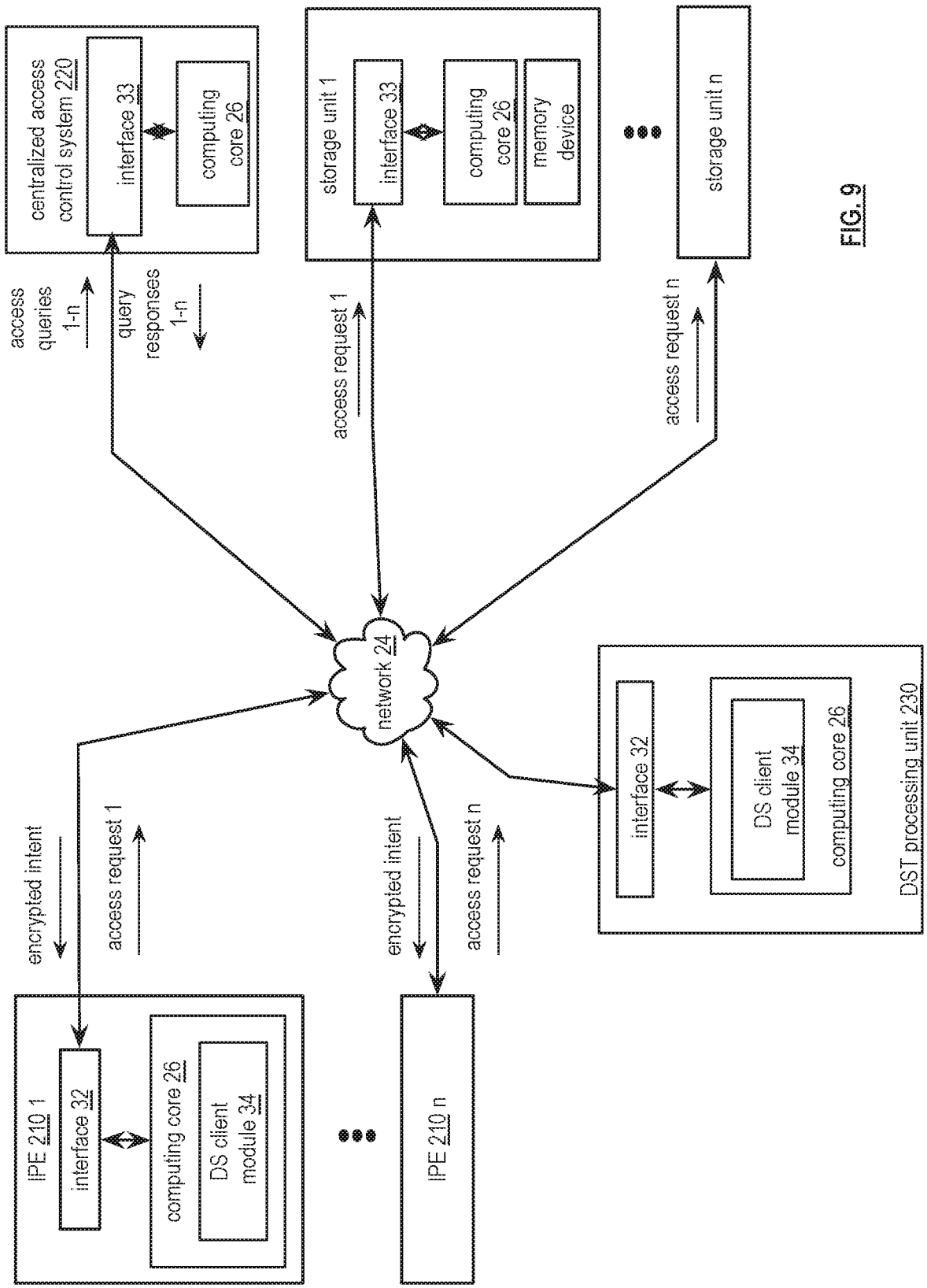
Figures 10, 11:
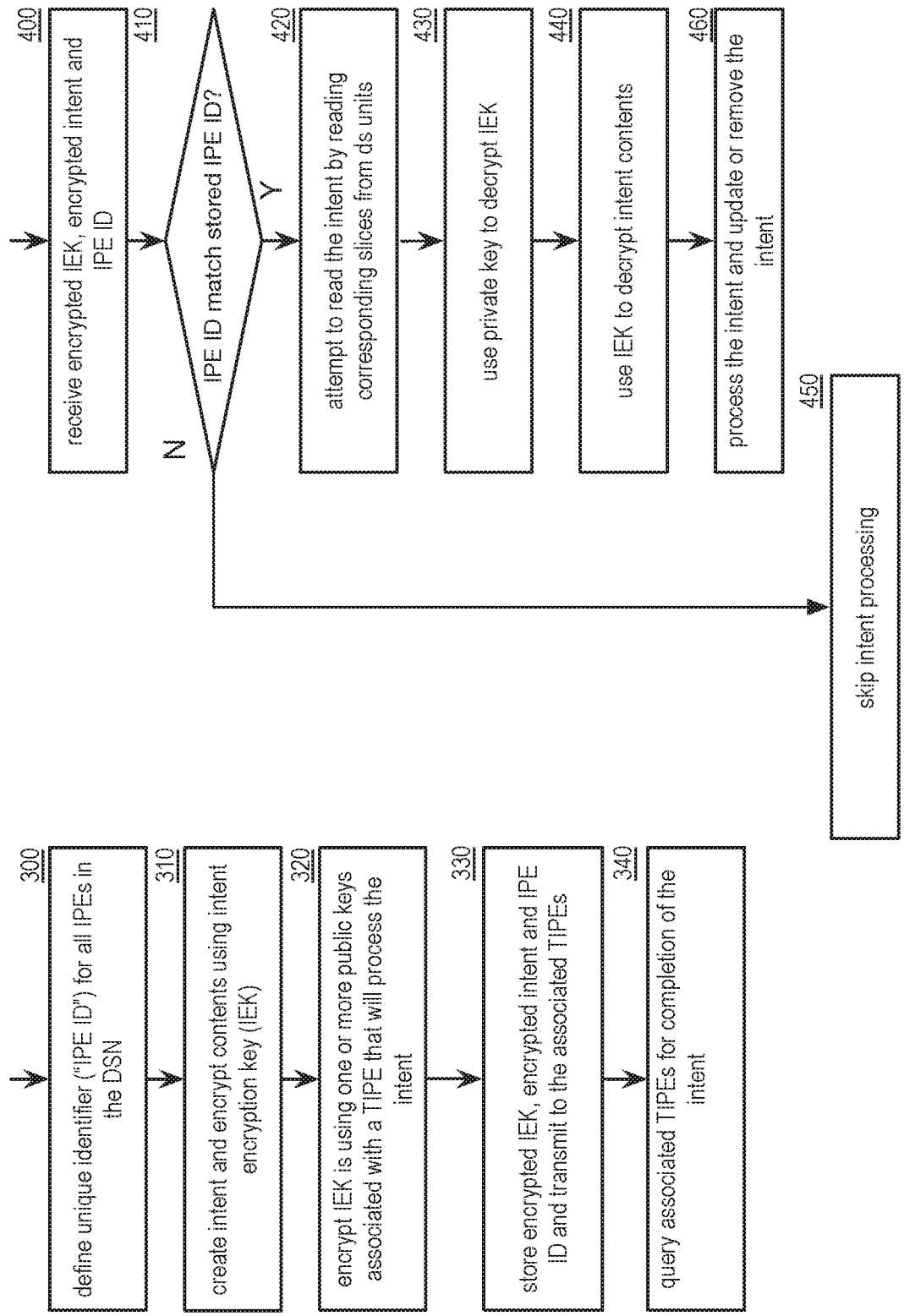

FIG. 9 is a schematic block diagram of an example of embodiment of a dispersed storage network that includes at least one intent processing entity in accordance with the present invention; and FIG. 10 is a flowchart illustrating an example of using trusted entities when processing intents in accordance with the present invention; and FIG. 11 is a flowchart illustrating an example of a trusted entity processing intents in accordance with the present invention.

DETAILED DESCRIPTION OF THE INVENTION

Figure 1:
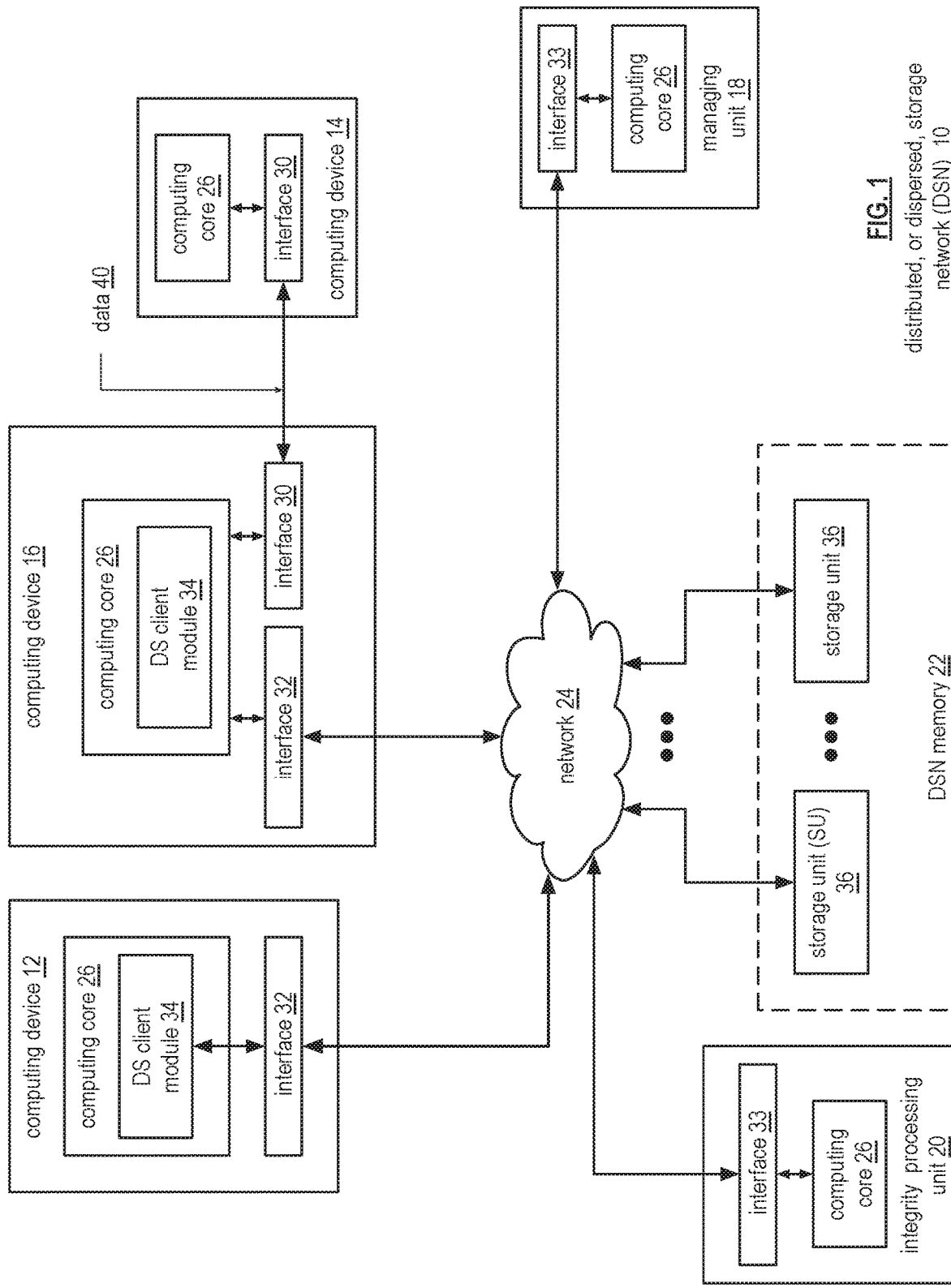
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
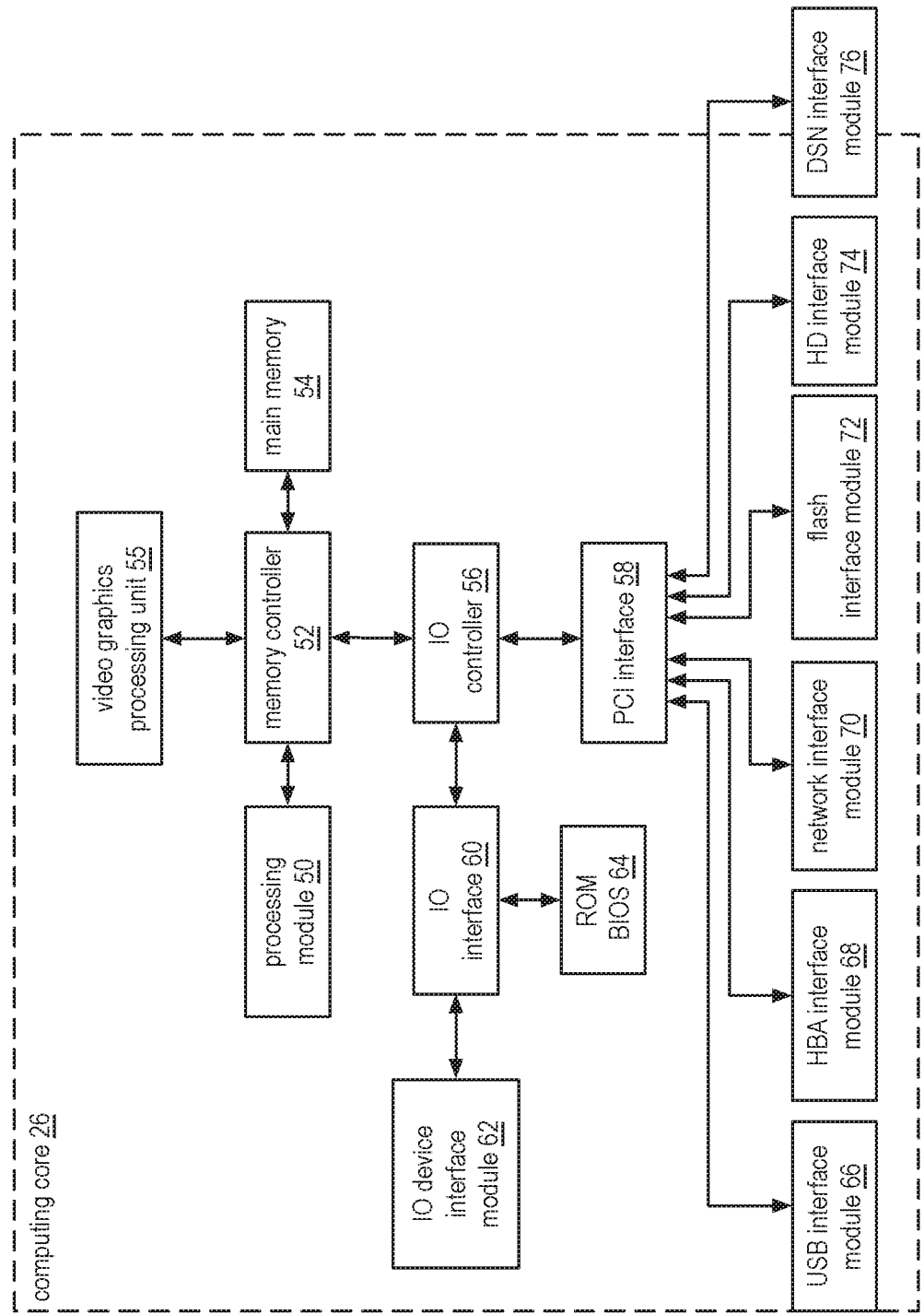
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
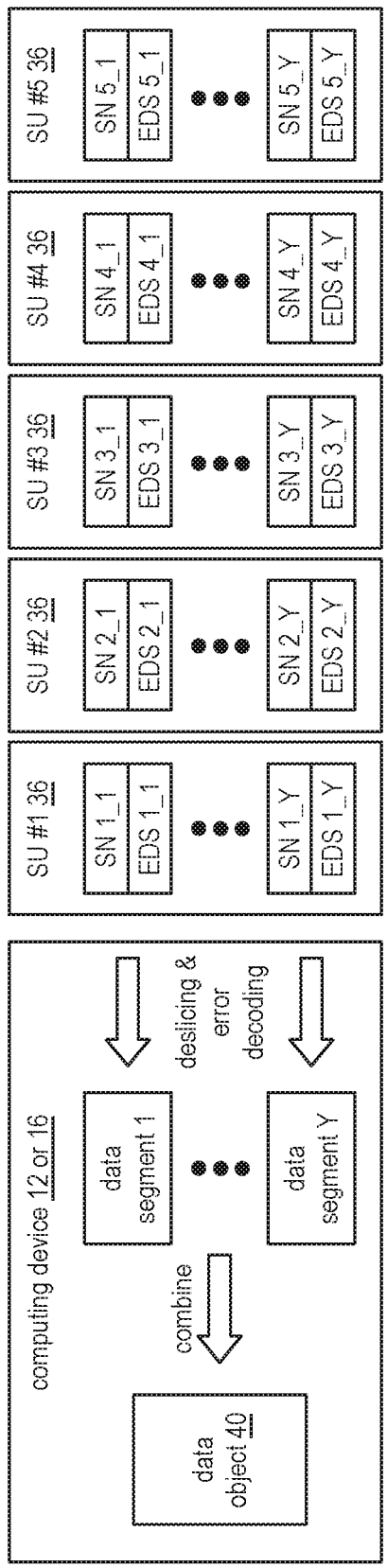
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
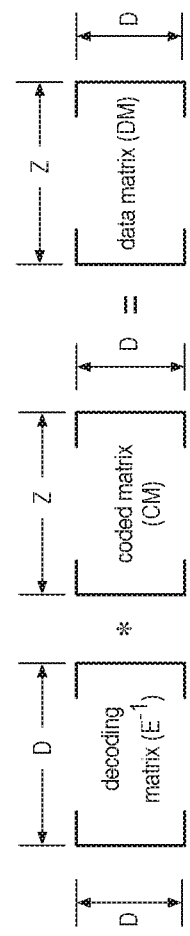
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of another embodiment of a dispersed storage network (DSN) that includes a plurality of intent processing entities (IPEs), a centralized access control system 220, at least one dispersed storage and task (DST) processing unit 230, the network 24 of FIG. 1, and a plurality of storage units 1-n. In some embodiments, each of the plurality of IPEs 1-n can be implemented by utilizing computing device 12, 14, and/or 16 of FIG. 1, and/or can otherwise utilize an interface such as interface 32 of FIG. 1 and/or the computing core 26 of FIG. 2. In some embodiments, the centralized access control system 220 can be implemented by utilizing the managing unit 18, the integrity processing unit 20, and/or another device that includes an interface such as interface 33 of FIG. 1 and computing core 26 of FIG. 2. The computing device 16 can include the interface 32 of FIG. 1, the computing core 26 of FIG. 1, and the DS client module 34 of FIG. 1. Some or all DST processing units 230 can be implemented by utilizing the computing device 16 functioning as a dispersed storage processing agent for computing device 14 as described previously. In some embodiments, some or all DST processing units 230 can function as additional IPEs. Each storage unit may be implemented utilizing the storage unit 36 of FIG. 1, and can operate as a distributed storage and task (DST) execution units as discussed herein. Each storage unit can include an interface such as interface 33, computing core 26 of FIG. 2, and one or more memory devices that store data slices. The DSN functions to control access when processing intents.

In a DSN memory, intents are a set of instructions to be processed and are leveraged as a means to guarantee the eventual consistency for operations not requiring immediate consistency. Intents may be stored as source data within DSN memory, such as in one or more storage units 1-n. Intents can be disperse stored in the same fashion as data objects, as multiple data slices in different storage units as discussed herein, and/or can be stored in a single location. Depending on a number of factors, including the deployment environment of DSN memory, it may be desirable to ensure that intents are processed in a more secure fashion or that the confidentiality of the intent content is protected. This can be accomplished by introducing a concept of trusted intent relationships, between DST processing units 230 and intent processing entities (IPE) 210, that is enforced as part of intent processing. IPEs belonging to such a relationship will be defined as trusted IPEs (TIPE). IPEs and/or TIPEs can be DST processing units, other computing devices 12, 14, and/or 16, or other entities that include a processor and a memory that can access network 24.

TIPEs can use a combination of public/private keys with trusted entity identification during intent processing. For example, all IPEs within a particular DSN memory space are assigned a unique identifier, referred to as an intent processing entity identifier (IPE ID). In this example when creating an intent, each of DST processing units 230 encrypt the content of the intent with an intent encryption key (IEK), followed by encryption of the IEK using one or more public keys associated with the one or more TIPEs that are intended to process the intent. In one example the IEK encryption can be accomplished using a unique key belonging to any TIPEs allowed to process a particular intent. Once a particular DST processing unit 230 has encrypted the intent along with the associated IEK, it will store the encrypted IEK together with the encrypted intent contents and the IPE ID (together "intent") and transmit the intent to the TIPEs with which the one or more public keys are associated.

Processing the intent in this example includes verifying by the each TIPE receiving the intent that the TIPE has the requisite trust to process the intent by ensuring that the IPE ID stored with the intent matches the expected IPE ID. When the IPE ID does not match the TIPE skips the intent processing step. When the IPE ID does match, the TIPE will attempt to read the intent by reading the corresponding slices from storage units identified in the slice name(s). As the example continues, the TIPE will then use its private key to decrypt the IEK and when successful, use the IEK to decrypt the contents of the intent. The TIPE can then process the intent, and when no further processing is indicated the DST processing unit 230 will either update or delete the intent.

In an example, DST processing unit 230 receives verification from associated TIPEs 210 that an intent has been received and processed and that the intent processing was executed according to expected security protocols. If verification is not received within an expected time period, or if one or more TIPEs transmit messages indicating failure of the intent processing, the intents may be retransmitted by DST processing unit 230 and failed intent(s) may be either deleted and/or updated. DST processing unit 230 may also inform the DS client responsible for the intent that one or more intents have failed to process.

Centralized access control system 220 can be utilized to ensure that a receiving DST processing unit has the appropriate permissions to handle specific intents in the system. In a policy-based access control system, configuration is provided that governs that entities can perform what operations on what resources. Such configuration will be referred to as access policies, and the access policies can be stored by, or otherwise can be accessible via the network by the centralized access control system. Certain access policies can be created to govern intent processing using a unique identifier that is assigned to each intent, referred to as Intent Resource Identifier or IRI. Policies can also use rules to specify which IPEs 210 can process which intents from which source DST processing units 230. Policies can also specify rules to what IPEs 210 can read, write, delete, overwrite intents and their associated slices. For example, policies can include granting or denying an IPE the permission to process any intent that it receives, granting or deny an IPE the permission to process any intent that it receives from a specific source sender, and/or granting or denying an IPE the permission to process any intent that it receives whose IRI is destined for it specifically.

During the creation and transmission of an intent, an IRI can be generated and assigned to the intent. The IRI can include embedded information, such as identification of the source DST processing unit 230 that is creating the intent and/or identification of destination storage units 1-n and/or destination DST processing units 230 capable of processing the intent. A source DST processing unit 230 can embed or otherwise associate the IRI with the actual intent information prior to transmitting the IRI to destination storage units for processing and/or storage.

To process an intent, an IPE 210 can attempt to read the intent by reading the corresponding slices from storage units that store the intent and/or its corresponding slices. An IPE can generate slice access requests for transmission to the storage units directly, or a DST processing unit 230 can generate the slice access requests for transmission to the storage units on behalf of the IPE. Each storage unit can examine the intent IRI upon receiving an access request from a IPE 210, and can then query the centralized access control system or leverage cached policy data to determine if the IPE 210 is allowed to continue to process the intent. Based on the configured policy rules and access for the intents, the IPE 210 will either be granted or denied the rights to process the intent and will act accordingly. The centralized access control system 220 can utilize the IRI and/or identifying information of the requesting IPE 210 sent by the storage unit to determine if access is granted based on the access policy information, and can generate and transmit a response to the storage unit. The storage unit can execute the request if access is granted and/or transmit a denial of access notification if access is denied. For example, the storage unit can transmit requested intent slices the to the IPE 210 upon determining that access is granted by the centralized access control system, and that the IPE is a TIPE for that intent, allowing the TIPE to read the intent and determine the steps for processing the intent.

These steps can also be utilized during the processing of the set of instructions of the intent. For example, after reading the intent from storage units, the IPE 210 can then process the intent by transmitting additional slice access requests to the same or different storage units. The storage units can again perform access control queries the centralized access control system 220. The storage unit can also cache policy data received from the centralized access control system in response to access queries, and can utilize this cached policy data in subsequent access requests, for example, when the same IPE makes additional slice access requests in subsequent steps of processing the intent.

If no further processing is required and/or if the intent processing is otherwise determined to be complete, the IPE 210 can update or remove the intent. The IPE can transmit an update and/or removal request to the storage units accordingly, and the storage units can then perform a similar access control query or leverage the cached policy data to ensure that the TIPE is authorized to perform the update or removal.

In various embodiments, a processing system of a storage unit includes at least one processor and a memory that stores operational instructions, that when executed by the at least one processor cause the processing system to receive, from an intent processing entity (IPE) via a network, a request to access at least one slice corresponding to an intent, where the request includes an intent resource identifier (IRI) associated with the intent. An access query is transmitted via the network to an access control system that includes the IRI and an IPE identifier associated with the IPE. A query response, generated by the access control system based on the IRI and the IPE identifier of the access query, is received from the access control system via the network. The request is executed when the query response indicates that permission to process the intent is granted to the IPE.

In various embodiments, a denial of access notification is transmitted to the IPE when the query response indicates that permission to process the intent is denied to the IPE. In various embodiments, the intent includes a set of instructions, and the request corresponds to at least one of the set of instructions. In various embodiments, the request corresponds to a request to read the intent, and executing the request includes transmitting the at least one slice to the IPE. In various embodiments, the request corresponds to a request to write the intent, and executing the request includes writing the at least one slice. In various embodiments, the request corresponds to a request to delete the intent, and executing the request includes deleting the at least one slice from memory. In various embodiments, the request is received subsequently to executing a prior request from the IPE associated with processing the intent, and the request is generated by the IPE in response to determining that processing of the intent is completed when the prior request was executed.

In various embodiments, the IRI further includes a plurality of destination storage unit identifiers that includes a storage unit identifier associated with the storage unit, and the request is transmitted to the storage unit by the IPE in response to determining that the IRI includes the storage unit identifier. In various embodiments, the IRI includes a source DS unit identifier associated with a DS processing unit responsible for creating the intent, and wherein the query response is generated by the access control system based on the source DS processing unit identifier. In various embodiments, policy data of the query response is stored in local cache. A subsequent request to access the at least one slice corresponding to the intent is received from the intent processing entity (IPE) via the network. The policy data of the query response is accessed from the local cache. The request is executed when the policy data indicates that permission to process the intent is granted to the IPE.

FIG. 10 is a flowchart illustrating an example of securely transmitting intents using one or more IPEs in TIPE relationships within DSN memory. In particular, a method is presented for use in association with one or more functions and features described in conjunction with FIGS. 1-12, for execution by a processor, such as the DST processing unit 230 illustrated in FIG. 12, that includes a processor or via another processing system of a dispersed storage network that includes at least one processor and memory that stores instructions that configure the processor or processors to perform the steps described below.

Step 300 includes one or more ds processing units defining a unique identifier to represent all IPEs deployed within a DSN, referred as an "IPE ID". In step 310, a ds processing unit determines to create an intent and encrypts the contents of the intent with an "intent encryption key" (IEK) and in step 320 the ds processing unit encrypts the IEK using one or more public keys associated with the TIPEs targeted to process the intent. The ds processing unit the encrypts the IEK using unique key belonging to the associate TIPEs allowed to process the intent. The method continues in step 330 where the encrypted IEK, encrypted intent and IPE ID are stored and transmitted to the associated TIPEs. Once the intent has been processed the originating ds processing unit may be notified of the successful processing. Alternatively, the ds processing unit may query the target TIPEs for information regarding the intent, as shown in step 340. Determining when to query may be based on a variety of mechanisms; for example, the originating ds processing unit may set a timer, such that if notification of successful processing of an intent is not received before the timer expires the ds processing unit may terminate the intent according to the same or similar security procedure and/or send another intent to replace the failed intent. Alternatively no query is required, and the TIPE update or remove the intent as detailed below.

FIG. 11 is a flowchart illustrating an example of the secure processing of an intent by a TIPE. In particular, a method is presented for use in association with one or more functions and features described in conjunction with FIGS. 1-12, for execution by an IPE, such as IPEs 210-1 through 210-*n* illustrated in FIG. 12, that includes a processor or via another processing system of a dispersed storage network that includes at least one processor and memory that stores instructions that configure the processor or processors to perform the steps described below.

In step 400 an IPE (TIPE) receives an encrypted IEK, encrypted intent contents and the IPE ID from a ds processing unit. In step 410 the IPE compares the received IPE ID with its own IPE ID to determine whether it has the requisite trust to process the intent. If the IPE IDs do not match the IPE skips processing the intent (step 450). When the IPE ID matches, the TIPE attempts to read the intent by reading corresponding slices from distributed storage units in step 420. The TIPE will then use its private key to decrypt the IEK in step 430, and then use the IEK to decrypt the intent contents in step 440. The method continues in step 460, where the TIPE processes the intent and when no further processing is required, removes or updates the intent.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices of a dispersed storage network (DSN), the method comprises:
   for all intent processing entities (IPEs) within the DSN, creating a unique identifier (IPE ID);
   creating one or more intents, wherein each of the one or more intents is a set of instructions to be processed by one or more associated IPEs;
   encrypting the one or more intents using a plurality of intent encryption keys (IEKs), wherein each respective intent is encrypted using a corresponding IEK;
   encrypting each IEK using a key associated with a trusted IPE to generate an encrypted IEK, wherein the trusted IPE is targeted to process the one or more intents;
   for each of the one or more intents, storing the encrypted IEK together with the encrypted intent, and an IPE ID corresponding to the trusted IPE;
   for each of the one or more intents, transmitting, via a network, the encrypted IEK together with the encrypted intent, and the IPE ID corresponding to the trusted IPE;
   for each of the one or more intents, setting a timer when transmitting, via the network, the encrypted IEK together with the encrypted intent, and the IPE ID corresponding to the trusted IPE;
   determining whether each of the one or more intents has been processed within a predetermined time period based at least partially on the timer; and
   for each of the one or more intents, in response to determining that the intent has not been processed within the predetermined time period, terminating the intent and transmitting another intent that replaces the intent.

2. The method of claim 1, wherein the key associated with a trusted IPE is a public key.

3. The method of claim 1 further comprises:
   for each of the one or more intents, querying the trusted IPEs targeted to process the one or more intents for information sufficient to determine whether the one or more intents have been processed.

4. The method of claim 1, wherein the determining whether each of the one or more intents has been processed is based on receiving one or more notifications from one or more trusted IPEs.

5. The method of claim 1 further comprises:
   when it is determined that the one or more intents have been processed, removing the one or more intents from ds memory.

6. The method of claim 1 further comprises:
   when it is determined that the one or more intents have been processed, updating the one or more intents.

7. A method for execution by an intent processing entity (IPE) in a distributed storage (DS) network that includes a processor, the method comprises:
   receiving, from a distributed storage (DS) processing unit via a network, an encrypted intent encryption key (IEK), together with an encrypted intent, and a unique identifier (IPE ID), wherein the encrypted intent comprises a set of instructions to be processed by the IPE and an embedded intent resource identifier (IRI) that includes identification of the DS processing unit that created the intent and identification of DS units, and further wherein the IPE ID is assigned to all IPEs in the DS network;
   determining whether the IPE is allowed to process the encrypted intent based on an access policy that governs intent processing using the IRI and a comparison of the IPE ID and an expected IPE ID;
   when the IPE is allowed to process the encrypted intent, attempting to read encoded data slices (EDS s) associated with the encrypted intent from the DS units;
   using a private key to decrypt the IEK;
   using the IEK to decrypt the encrypted intent to obtain a decrypted intent;
   processing the decrypted intent; and
   removing the decrypted intent from ds memory.

8. The method of claim 7, wherein the determining whether the IPE is allowed to process the intent is based on whether the IPE is trusted to process the intent.

9. The method of claim 7, wherein the encrypted IEK associated with the IPE is a public key.

10. The method of claim 7, further comprises:
    when the IPE is not allowed to process the intent, determining to avoid processing the intent.

11. The method of claim 7, further comprises:
    notifying the DS processing unit that the intent has been successfully processed.

12. The method of claim 7, further comprises:
    notifying the DS processing unit that processing the intent has been unsuccessful.

13. A computing device comprising:
    an interface configured to interface and communicate with a dispersed storage network (DSN);
    memory that stores operational instructions; and
    a processor operably coupled to the interface and to the memory, wherein the processor, when operable within the computing device based on the operational instructions, is configured to:
      create a unique identifier (IPE ID) for all intent processing entities (IPEs) within the DSN;
      create one or more intents, wherein each of the one or more intents is a set of instructions to be processed by one or more associated IPEs;

encrypt the one or more intents using a plurality of intent encryption keys (IEKs), wherein each respective intent is encrypted using a corresponding IEK;

encrypt each IEK using a key associated with a trusted IPE to generate an encrypted IEK, wherein the trusted IPE is targeted to process the one or more intents;

for each of the one or more intents, store the encrypted IEK together with the encrypted intent, and an IPE ID corresponding to the trusted IPE;

for each of the one or more intents, transmit, via a network, the associated encrypted IEK together with the encrypted intent, and the IPE ID corresponding to the trusted IPE;

for each of the one or more intents, set a timer when transmitting, via the network, the encrypted IEK together with the encrypted intent, and the IPE ID corresponding to the trusted IPE;

determine whether each of the one or more intents has been processed within a predetermined time period based at least partially on the timer; and for each of the one or more intents, in response to determining that the intent has not been processed within the predetermined time period, terminate the intent and transmit another intent that replaces the intent.

14. The computing device of claim 13, wherein the processor, when operable within the computing device based on the operational instructions, is further configured to:

for each of the one or more intents, query the trusted IPEs targeted to process the one or more intents for information sufficient to determine whether the one or more intents have been processed.

15. The computing device of claim 13, wherein the key associated with a trusted IPE is a public key.

16. The computing device of claim 13, wherein the determine whether each of the one or more intents has been processed is based on receiving one or more notifications from one or more trusted IPEs.

17. The computing device of claim 13, wherein the processor, when operable within the computing device based on the operational instructions, is further configured to:

remove the one or more intents from ds memory when it is determined that the one or more intents have been processed.

18. The method of claim 1, further comprises, for each of the one or more intents, generating an intent resource identifier (IRI) associated with the intent, the IRI including identification of a source processing unit that created the intent, identification of a destination storage unit, and identification of a destination processing unit capable of processing the intent.

19. The method of claim 18, further comprises, for each of the one or more intents, generating an access policy that governs intent processing using the IRI, the access policy specifying the trusted IPE that is permitted to process the intent from the source processing unit.

20. The method of claim 7, wherein the access policy denies the IPE permission to process any intent that is received from a specific source sender.

\* \* \* \* \*